(12) United States Patent
Beckey et al.

(10) Patent No.: US 9,753,178 B2
(45) Date of Patent: Sep. 5, 2017

(54) SENSOR COMPONENT STABILIZATION

(71) Applicant: Banner Engineering Corporation, Minneapolis, MN (US)

(72) Inventors: Thomas Beckey, Edina, MN (US); Neal Andrew Schumacher, Plymouth, MN (US); Wade David Oberpriller, Chaska, MN (US)

(73) Assignee: BANNER ENGINEERING CORPORATION, Minneapolis, MN (US)

( * ) Notice: Subject to any disclaimer, the term of this patent is extended or adjusted under 35 U.S.C. 154(b) by 331 days.

(21) Appl. No.: 14/552,749

(22) Filed: Nov. 25, 2014

(65) Prior Publication Data

US 2015/0145387 A1 May 28, 2015

Related U.S. Application Data

(60) Provisional application No. 61/963,249, filed on Nov. 26, 2013.

(51) Int. Cl.
*G01V 8/10* (2006.01)
*G02B 7/00* (2006.01)
(Continued)

(52) U.S. Cl.
CPC ........ *G01V 8/10* (2013.01); *C09J 5/00* (2013.01); *G02B 7/003* (2013.01);
(Continued)

(58) Field of Classification Search
CPC ...... G01J 3/0202; G02B 6/4226; G02B 7/003; G02B 7/004; G02B 7/023; G02B 27/62; G11B 5/48; G11B 5/105; G11B 7/08
(Continued)

(56) References Cited

U.S. PATENT DOCUMENTS 3,916,336 A * 10/1975 Kaiser .................. H01S 3/02
372/65
4,550,352 A * 10/1985 Nakao ................... G11B 5/56
360/291.3
(Continued)

FOREIGN PATENT DOCUMENTS

JP 11023699 A * 1/1999 ............ G01B 11/00
JP 2007179615 A * 7/2007 ............. G11B 7/08

*Primary Examiner* — R. A. Smith
(74) *Attorney, Agent, or Firm* — Merchant & Gould P.C.

(57) ABSTRACT

An example method for stabilizing a sensor component includes: positioning the sensor component relative to a support with retaining members in contact with the sensor component, a first of the retaining members being a resilient biasing member and a second one of the retaining members being an adjustable retaining member; adjusting the adjustable retaining member to reposition the sensor component and deform the resilient retaining member; immobilizing the sensor component with an additional, rigid retaining member in contact with the sensor component; and filling a space between the sensor component and the support with a glue. An example holder of a sensor component includes support members; retaining members adapted to cooperatively adjustably retain the sensor component support members; and an additional, rigid retaining member adapted to cooperate with other retaining members to fixedly retain the sensor component.

14 Claims, 9 Drawing Sheets

(51) Int. Cl.
*C09J 5/00* (2006.01)
*B29L 31/00* (2006.01)

(52) U.S. Cl.
CPC .... *B29L 2031/752* (2013.01); *Y10T 29/49863* (2015.01); *Y10T 29/49947* (2015.01)

(58) Field of Classification Search
USPC .................................. 33/289, 286; 250/239
See application file for complete search history.

(56) References Cited

U.S. PATENT DOCUMENTS

| | | | | |
|---|---|---|---|---|
| 4,574,371 A * | 3/1986 | Takemura et al. | ....... | G11B 7/08 369/100 |
| 4,653,063 A * | 3/1987 | Acharekar et al. | ..... | H01S 3/025 372/107 |
| 4,764,983 A * | 8/1988 | Walter | ................ | B23K 26/035 372/107 |
| 4,916,713 A * | 4/1990 | Gerber | ................ | G01S 7/4813 372/107 |
| 5,254,847 A * | 10/1993 | Hata et al. | ........... | H04N 1/0312 250/208.1 |
| 5,345,432 A * | 9/1994 | Kasahara et al. | ...... | G11B 7/123 250/239 |
| 5,419,072 A * | 5/1995 | Moore et al. | ............. | F41G 1/35 362/114 |
| 7,055,252 B2 * | 6/2006 | Wu | ...................... | G01C 15/004 33/286 |
| 7,237,342 B2 * | 7/2007 | Chen et al. | ........... | G01S 7/4972 33/286 |
| 7,296,360 B2 * | 11/2007 | El-Katcha et al. | .. | G01C 15/004 33/286 |
| 7,427,748 B2 * | 9/2008 | Deguchi et al. | ...... | G01S 7/4812 250/216 |
| 7,469,481 B2 * | 12/2008 | Nash et al. | .......... | G01C 15/004 33/286 |
| 7,793,575 B2 * | 9/2010 | Ushiwata et al. | ... | B23D 59/003 83/520 |
| 2003/0209661 A1 * | 11/2003 | Chen et al. | ............ | G02B 7/026 250/239 |
| 2004/0257927 A1 * | 12/2004 | Sogawa et al. | ......... | G11B 7/22 369/44.14 |

\* cited by examiner

SENSOR COMPONENT STABILIZATION

CROSS-REFERENCE

This application claims the benefit of U.S. Provisional Application Ser. No. 61/963,249, filed Nov. 26, 2013, the content of which provisional application is incorporated herein by reference.

BACKGROUND

The present disclosure relates to alignment of a sensor component, such as a transmitter, within a sensor housing. In certain conventional sensors of type having adjustable emitters, the emitters have barrels disposed in matching sockets, allowing the direction in which the emitters are pointed to be varied. The barrel of the emitter is typically held in place by screws balanced by springs only. Glue is used to maintain the alignment after the alignment adjustment is done. However, it has been observed that the alignment can undergo significant drift as the ambient temperature changes. It is thus desirable to device a sensor assembly and method to allow convenient adjustment of the emitter, or another adjustable component while maintaining the stability of the sensor.

SUMMARY

In one example aspect of this disclosure, a method for stabilizing a sensor component includes: positioning a portion of the sensor component relative to a support with a plurality of retaining members in contact with the portion of the sensor component, the plurality of retaining members including at least a first one of the retaining members being a resilient biasing member and a second one of the retaining members being an adjustable retaining member; adjusting the adjustable retaining member to reposition the portion of the sensor component relative to the support and deform the resilient retaining member; immobilizing the portion of the sensor component relative to the support with an additional, rigid retaining member in contact with the portion of the sensor component; and filling a space between the portion of the sensor component and the support with a glue.

DETAILED DESCRIPTION

The present disclosure relates to securing a sensor component, such as a transmitter, within a sensor housing with minimized alignment variability over a wide range of temperature variation, while facilitating ease of alignment adjustment. The disclosure is made with reference to an example device illustrated in the attached FIGS. 1-9.

Figure 1:
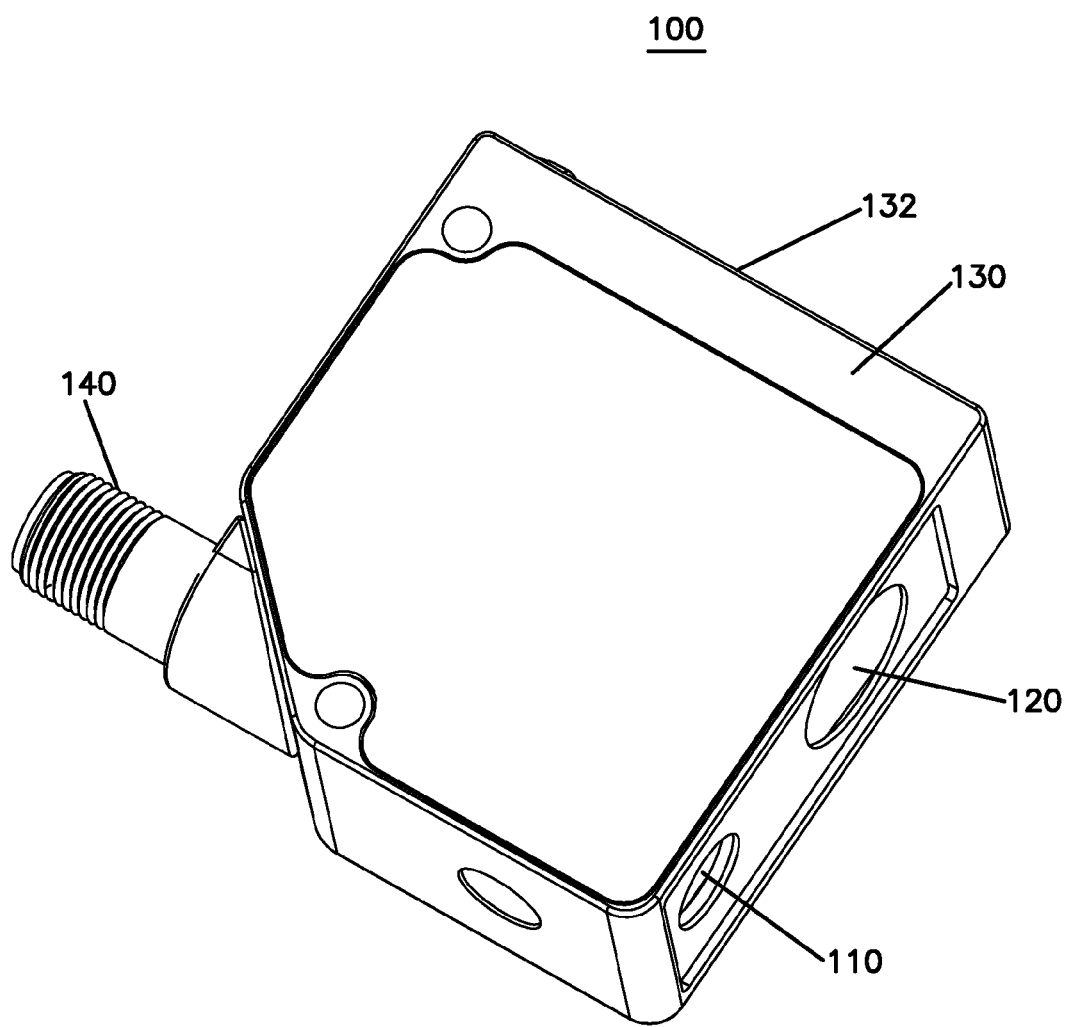
FIG. 1 illustrates a sensor according to an aspect of the present disclosure.

Referring to FIG. 1, a sensor (100) has an emitter (110) for launching light pulses (such as laser pulses) toward an object, and a receiver (120) for receiving the light pulses reflected by the object. The emitter (110) and receiver (120) are both located in a housing (130), which can also have a display (not shown) located on one of the faces (132) of the housing (130) for displaying information such as object distance or calibration information. The sensor (100) also has a cable connector (140) for connecting the sensor (100) to external electronics. It is noted that it is not a requirement that the receiver is located in the same housing as the emitter.

Figure 2:
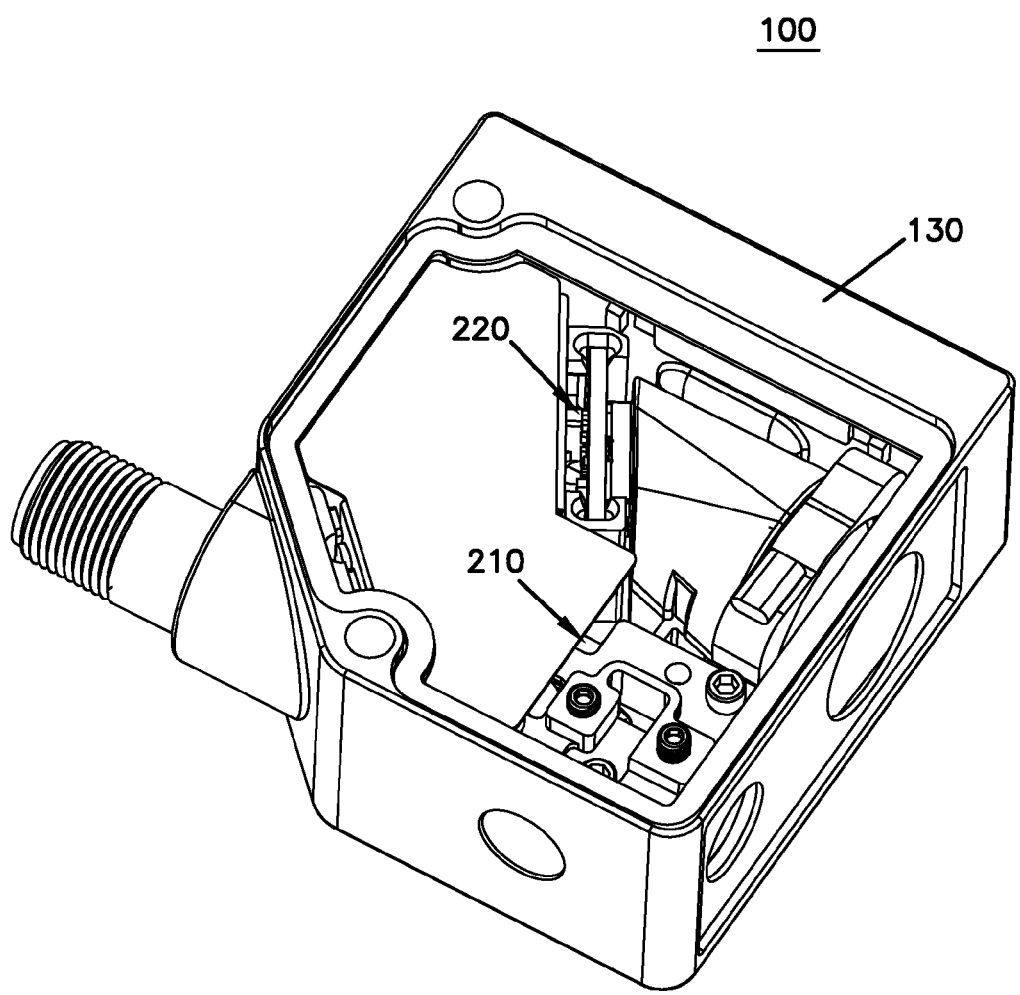
FIG. 2 illustrates another view of the sensor shown in FIG. 1, with mounting assembly visible.
Figure 3:
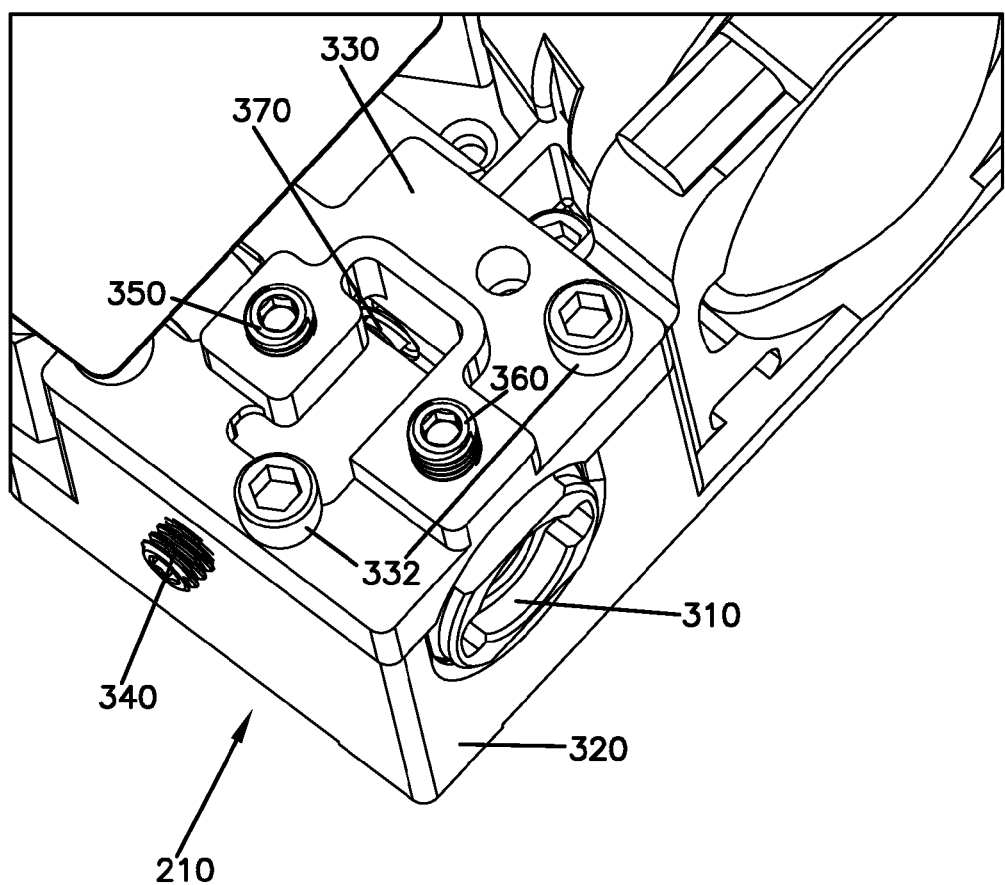
FIG. 3 is a more detailed view of the mounting assembly shown in FIG. 2.
Figure 4:
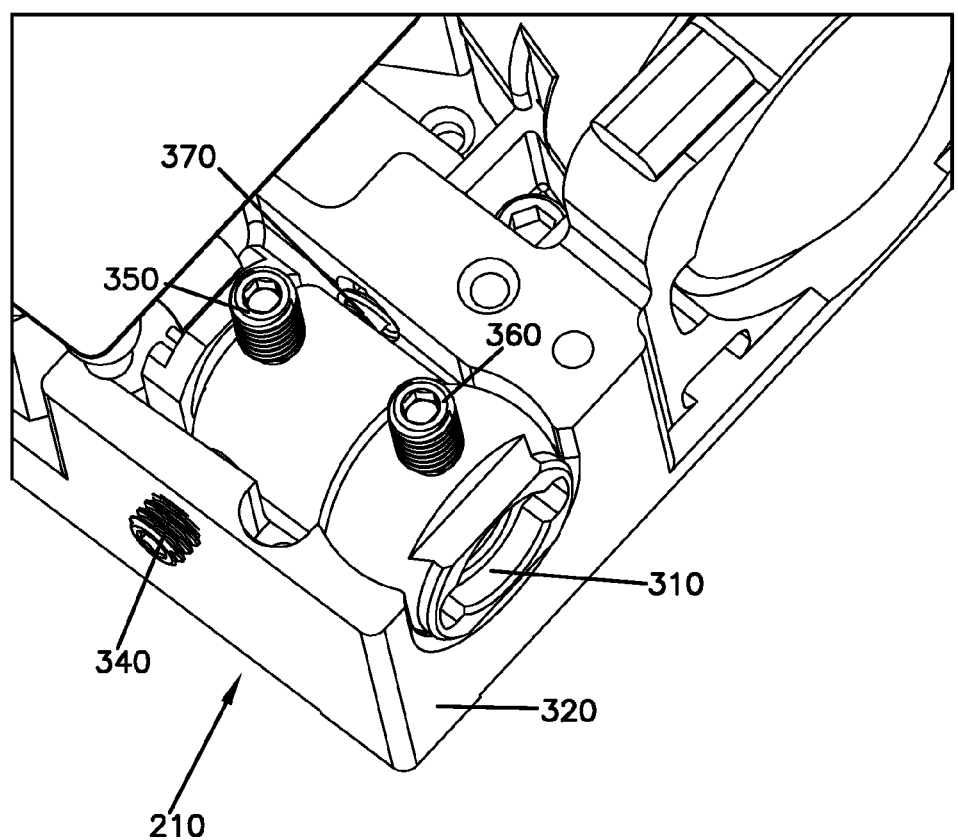
FIG. 4 is another view of the mounting assembly shown in FIG. 1, with certain parts removed from the view to more clearly show the various retaining members for securing the barrel of the emitter.

Inside the housing (130), as shown in FIG. 2, the emitter is mounted in a holder, or mounting assembly (210). The receiver includes a photoelectric module (220) for converting optical signals to electrical signals. As shown in FIG. 3, the mounting assembly (210) secures the barrel (310) of the emitter and includes a body portion (320), which serves as a support, and cap (330). The cap (330) is bolted to the body portion (320) by one or more screws (332). A number of securing elements, or retaining members, such as set screws (340, 350, 360) and screw/spring assembly (370) are disposed in the mounting assembly (210) for maintaining the alignment of the emitter barrel (310). FIG. 4 shows, with the cap (330) removed from the view, the relationship between the barrel (310) and the securing elements (340, 350, 360, 370).

Figure 5:
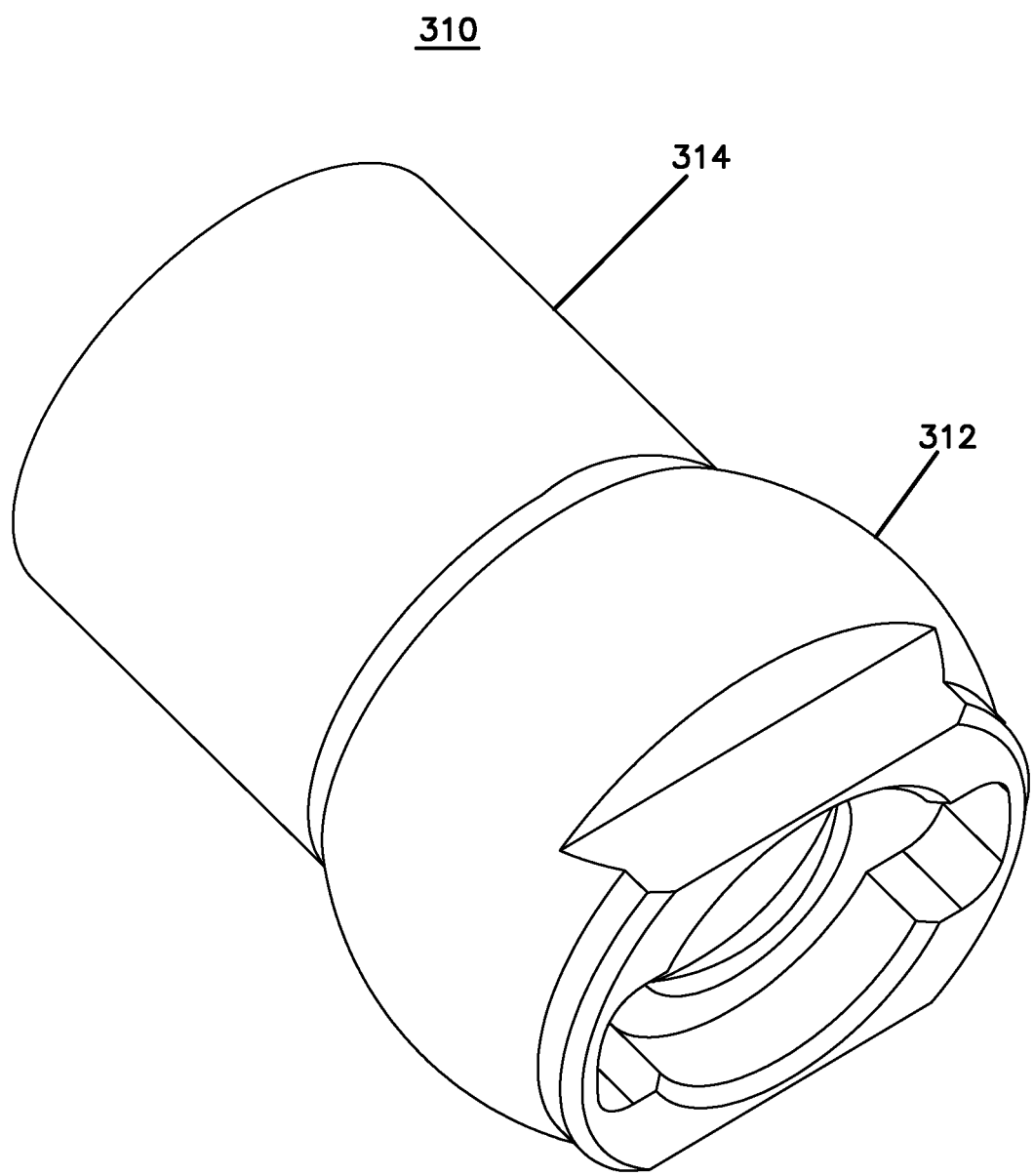
FIG. 5 illustrates an emitter as an example of an adjustable component in a sensor according to an aspect of this disclosure.
Figure 6:
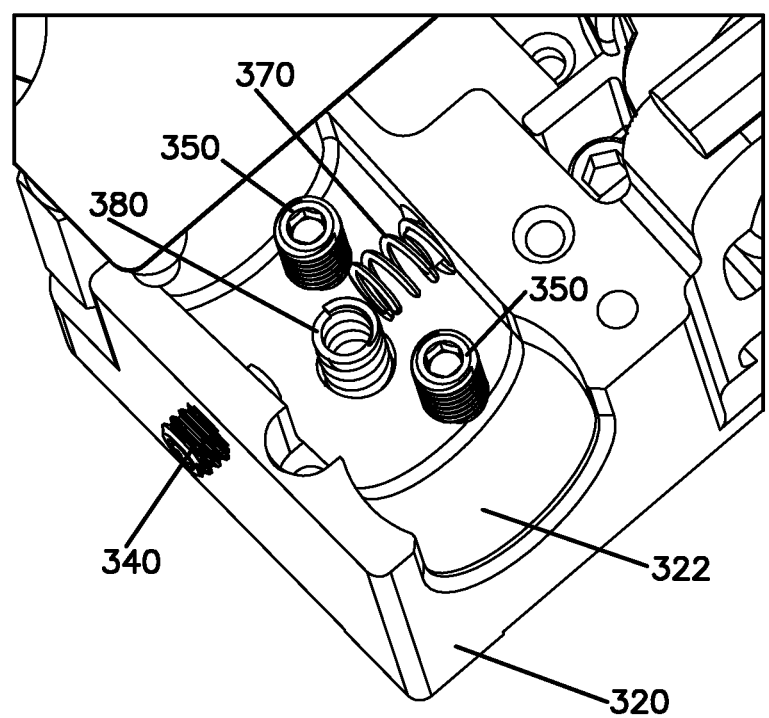
FIG. 6 illustrates a portion of the body of the sensor shown in FIG. 1, showing a cavity in the body for receiving the emitter.

As shown in FIG. 5, the emitter barrel (310) has a bulbous portion (312) and cylindrical portion (314). As shown in FIG. 6, the body portion (320) of the mounting assembly (210) defines a recess, including a concave portion 322 that the bulbous portion (312) of the barrel (310) fits into so that the barrel can be secured in the mounting assembly (210) while being tilted to adjust the alignment of the emitter (110).

Figure 7:
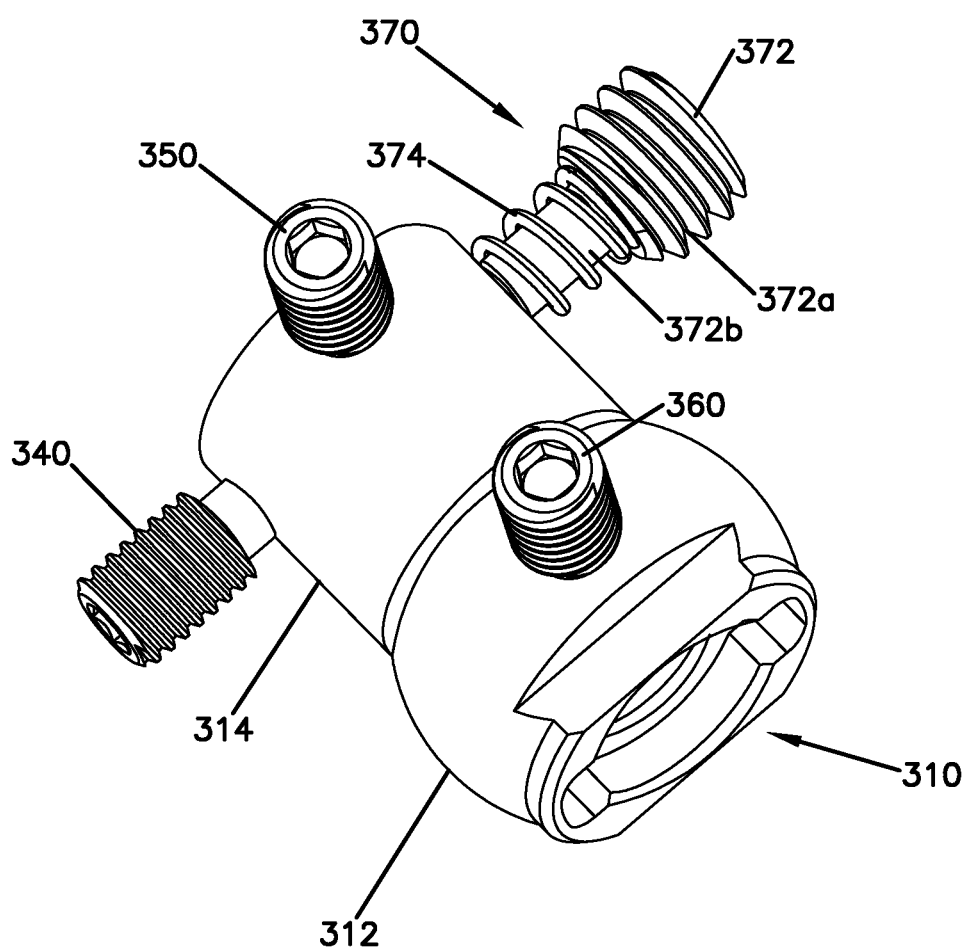
FIG. 7 illustrates a view of the sensor shown in FIG. 1, with the emitter and various retaining members isolated from the remainder of the sensor.
Figure 8:
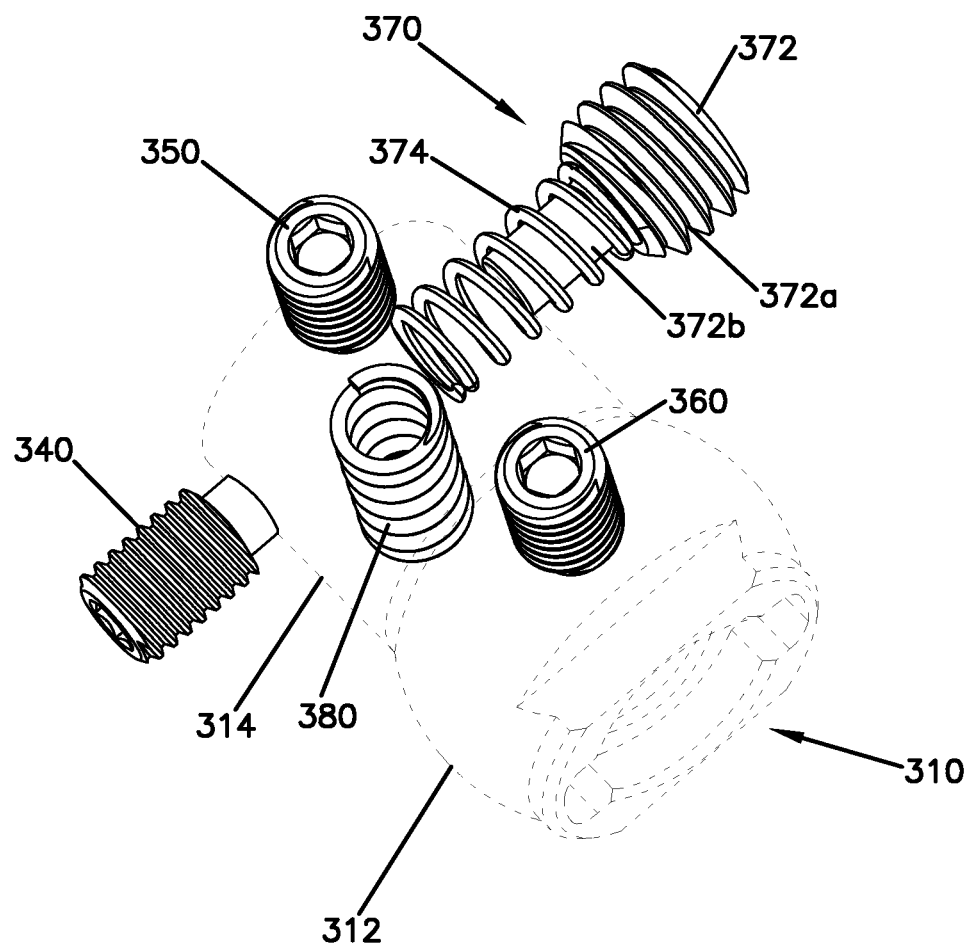
FIG. 8 is another view of the assembly shown in FIG. 7, with the emitter rendered transparent to show additional retaining members not visible in the view shown in FIG. 7.

FIG. 6 also shows an additional securing element, which in this case is a spring (380) disposed in the body portion (320) of the mounting assembly (210). As shown in FIGS. 7 and 8 (with the barrel (310) rendered as transparent in FIG. 8 to show all securing elements), the spring (380) and screw (350) secures the barrel (310) vertically at the cylindrical portion (314) but allows the vertical position of the cylindrical portion (314) to be adjusted by turning the screw (350). Similarly, the screw (340) and screw/spring assembly (370) secures the barrel (310) horizontally at the cylindrical portion (314).

Figure 9:
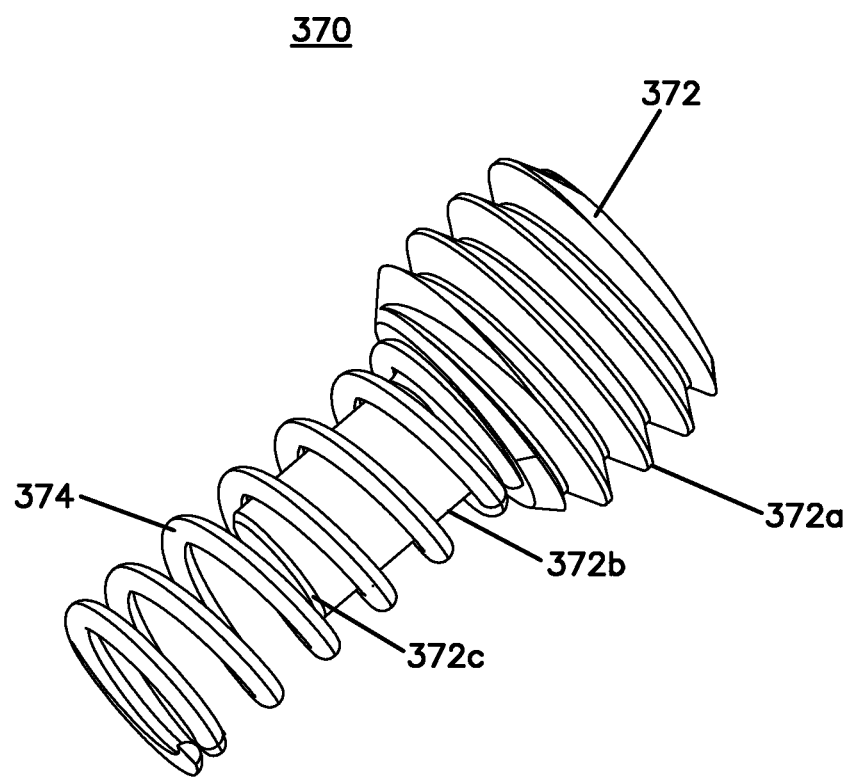
FIG. 9 illustrates a retainer member according to an aspect of this disclosure.

As shown in FIG. 9, the screw/spring assembly (370) includes a screw (372) and spring (374). The screw (372) has a threaded portion (372a) and a rod portion (372b), which as a smaller diameter than the threaded portion (372a), such that the rod portion (372b) fits inside the spring (374). When the screw (372) is retracted from the barrel (310), the screw (340) and screw/spring assembly (370) secures the barrel (310) horizontally at the cylindrical portion (314) but allows the horizontal position of the cylindrical portion (314) to be adjusted by turning the screw (340). When the screw (372) is advanced so that the end (372c) of the screw is in firm contact with the cylindrical portion (314) of the barrel (310), the position of the cylindrical portion (314) of the barrel (310) is fixed, preferably not only horizontally but also vertically.

In addition, a screw (360) can be used to fix the position of the bulbous portion (312) of the barrel (310), as shown in FIGS. 3, 4, 7 and 8. Alternatively, the body portion (320) of the mounting assembly (210) can be sized relative to the barrel (310) such that the bulbous portion (312) of the barrel (310) can be securely retained between the body portion (320) and the cap (330) by tightening the screws (332). The cap (330) can also define a concave surface substantially matching a portion of the surface of the bulbous portion (312), so that the bulbous portion (312) is substantially continuous surface-to-surface contact with the body portion (320) and cap (330) of the mounting assembly (210).

In another example configuration, a screw/spring assembly of the kind shown in FIG. 9 can be used instead of the spring (380) so that the vertical position of the cylindrical portion (314) of the barrel (310) can be adjusted and fixed.

Furthermore, the space between the barrel (310) and the mounting assembly is filled with glue (such as an epoxy), after the alignment of the barrel (310) has been adjusted and fixed, to further maintain the alignment.

The barrel and mounting assembly components are all metal in this example.

With the mounting assembly described above, especially with the feature of the screw/spring assembly, the alignment of the emitter barrel (or any other device for which alignment needs to be ensured) can be conveniently adjusted with the barrel held between screws and springs, i.e., with the screw in the screw/spring assembly in a refracted position. Once the adjustment is complete, the screw in the screw/spring assembly is tightened so that the barrel is securely held in place by at least two screws. The glue is then added to fill the space surrounding the barrel and further maintain the alignment.

In conventional sensors of this type, the barrel of the emitter is typically held in place by screws balanced by springs only. Glue is used to maintain the alignment after the alignment adjustment is done. However, it has been observed that the alignment can undergo significant drift as the ambient temperature changes. With the device described above, the alignment is fixed by screws after allowing adjustment. Improved alignment stability against temperature change is achieved while retaining the convenience of adjustment. Even with the metal screws, it is expected that the emitter barrel and other component will move around with varying ambient temperatures. The desired result is that even though the parts move around, they return to the same location when the temperature returns to the starting point. It has been found that glue does not return consistently to the original starting point but the metal nearly does. It is believed that this difference in behavior is attributable to the disordered molecular structure of the glue not being repeatable under varying temperature conditions, whereas the ordered nature of the molecules of metals exhibit the desired behavior where they do come to turn their original starting point naturally. One useful purpose of using the glue is to take up any void volume so that the barrel will not shift with shock loading or vibrations since the mechanical connections could be compromised under these conditions.

We claim:

1. A method for stabilizing a sensor component having a barrel defining an axis, the barrel including a bulbous portion, the method comprising:
   positioning the barrel of the sensor component relative to a support with a plurality of retaining members in contact with the portion of the barrel, at least a first one of the plurality of the retaining members being a resilient biasing member, and a second one of the plurality of retaining members being an adjustable retaining member, the positioning including retaining the bulbous portion at least partially within a concave recess defined in the support and substantially fitting the bulbous portion so that the barrel can be axially moved while the bulbous portion is retained by the concave recess;
   adjusting the adjustable retaining member to axially move the barrel of the sensor component relative to the support and deform the resilient biasing member;
   immobilizing the barrel of the sensor component relative to the support with a first additional, rigid retaining member in contact with the portion of the sensor component; and
   filling a space between the portion of the sensor component and the support with a glue.

2. The method of claim 1, wherein the resilient biasing member comprises a spring and the adjustable retaining member and the first additional retaining member each comprise a metal screw.

3. The method of claim 1, wherein the resilient biasing member and adjustable retaining member are in contact with a cylindrical portion of the barrel, and the adjusting the adjustable retaining member comprises adjusting the adjustable retaining member to axially move the cylindrical portion of the barrel.

4. The method of claim 3, wherein the immobilizing comprises advancing the first additional, rigid retaining member to be in contact with the cylindrical portion of the barrel.

5. The method of claim 4, further comprising immobilizing the bulbous portion of the barrel with a second additional, rigid retaining member in contact with the bulbous portion.

6. The method of claim 5, wherein the second rigid retaining member comprises a metallic member screwed to the support.

7. A holder of a sensor component having a barrel defining an axis, the barrel including a bulbous portion, the holder comprising:
   a support member defining a concave recess and substantially fitting the bulbous portion so that the barrel can be axially moved while the bulbous portion is retained at least partially in the concave recess;
   a plurality of retaining members adapted to cooperatively adjustably retain the barrel in a position relative to the support member, at least one of the plurality of retaining members comprising a resilient retaining member, and at least one of the remainder of the retaining members comprising a rigid, adjustable retaining member, wherein the resilient retaining member is adapted to deform to accommodate repositioning of the portion of the sensor component when the adjustable retaining member is adjusted; and
   a first additional, rigid retaining member adapted to cooperate with at least some of the plurality of retaining member to fixedly retain the sensor component in a position relative to the support member.

8. The holder of claim 7, wherein the resilient retaining member comprises a spring, and the adjustable retaining member and additional, rigid retaining member each comprise a metal retaining member.

9. The holder of claim 8, wherein the spring comprises a coil spring, and the adjustable retaining member and additional, rigid retaining member each comprise a metal screw.

10. The holder of claim 9, wherein the coil spring is disposed coaxially with the additional, rigid retaining member, the additional, rigid retaining member being adapted to be advanced to come into contact with the portion of the sensor component to fixedly retain the sensor component in a position relative to the support member.

11. A holder of a sensor component, the holder comprising:
 one or more support members;
 a plurality of retaining members adapted to cooperatively adjustably retain the sensor component in a position relative to the one or more support members;
 an additional, rigid retaining member adapted to cooperate with at least some of the plurality of retaining member to fixedly retain the sensor component in a position relative to the one or more support members,
 one of the one or more support members defining a recessed portion adapted to accommodate a portion of the sensor component, the recess having a shape for permitting rotational repositioning of the sensor component relative to the one or more support members.

12. The holder of claim 11, further comprising a glue filling a space between the sensor component and the one or more support members.

13. A sensor, comprising a sensor component and a holder of claim 11 adapted to retain the sensor component.

14. The sensor of claim 13, further comprising a glue adapted to fill a space between the sensor component and the support member.

* * * * *